US011846364B2

(12) United States Patent
Kaneko et al.

(10) Patent No.: US 11,846,364 B2
(45) Date of Patent: Dec. 19, 2023

(54) ELECTROMAGNETIC VALVE

(71) Applicant: HAMANAKODENSO CO., LTD., Kosai (JP)

(72) Inventors: Fumiaki Kaneko, Kosai (JP); Masashi Sugano, Kosai (JP); Yutaka Sato, Kosai (JP); Masahiro Hisada, Kosai (JP)

(73) Assignee: HAMANAKODENSO CO., LTD., Kosai (JP)

( * ) Notice: Subject to any disclaimer, the term of this patent is extended or adjusted under 35 U.S.C. 154(b) by 0 days.

(21) Appl. No.: 17/940,333

(22) Filed: Sep. 8, 2022

(65) Prior Publication Data

US 2023/0003309 A1     Jan. 5, 2023

Related U.S. Application Data

(63) Continuation of application No. PCT/JP2021/005024, filed on Feb. 10, 2021.

(30) Foreign Application Priority Data

Mar. 13, 2020   (JP) ................................ 2020-044326

(51) Int. Cl.
   *F16K 31/06*    (2006.01)
   *F16K 11/044*   (2006.01)
   *F16K 11/056*   (2006.01)

(52) U.S. Cl.
   CPC ........ *F16K 31/0631* (2013.01); *F16K 11/044* (2013.01); *F16K 11/056* (2013.01); *Y10T 137/87788* (2015.04)

(58) Field of Classification Search
   CPC ............ F16K 11/044; Y10T 137/7927; Y10T 137/7929; Y10T 137/8667;
   (Continued)

(56) References Cited

U.S. PATENT DOCUMENTS

| 2,934,090 A | * | 4/1960 | Kenann | ................. | F16K 11/044 |
| | | | | | 137/625.5 |
| 3,329,165 A | * | 7/1967 | Lang | ..................... | F16K 27/029 |
| | | | | | 137/625.5 |

(Continued)

FOREIGN PATENT DOCUMENTS

| JP | S5138728 U | 3/1976 |
| JP | 2003287152 A | 10/2003 |

(Continued)

OTHER PUBLICATIONS

U.S. Appl. No. 17/940,306, filed Sep. 8, 2022, Kaneko et al.

*Primary Examiner* — Robert K Arundale
(74) *Attorney, Agent, or Firm* — Harness, Dickey & Pierce, P.L.C.

(57) ABSTRACT

An electromagnetic valve is configured with an electromagnetic section, a flow path section, and a sealing member between them. This separate arrangement improves a degree of freedom for arranging inflow and/or outflow passage. This separate arrangement also enables to reduce a size of the electromagnetic section. A plunger comes in contact with a central portion of a spherical portion of a valve member. A normally open compression spring comes in contact with a peripheral portion of the valve member. The valve member can be reliably seated on the normally close valve seat even if the plunger is slightly tilted.

6 Claims, 8 Drawing Sheets

(58) Field of Classification Search
CPC ..... Y10T 137/87788; Y10T 137/87845; Y10T 137/87861
See application file for complete search history.

(56) References Cited

U.S. PATENT DOCUMENTS

| | | | |
|---|---|---|---|
| 4,442,998 A * | 4/1984 | Ohyama | H01F 7/13 137/625.5 |
| 4,915,134 A * | 4/1990 | Toliusis | F16K 11/044 137/625.65 |
| 7,028,708 B1 * | 4/2006 | Langenfeld | F16K 17/18 137/513.5 |
| 2007/0164243 A1 * | 7/2007 | Volz | F16K 31/0603 251/30.03 |
| 2014/0084194 A1 | 3/2014 | Kibune | |

FOREIGN PATENT DOCUMENTS

| | | | |
|---|---|---|---|
| JP | 2014066309 A | 4/2014 | |
| JP | 2015045360 A | 3/2015 | |

* cited by examiner

ELECTROMAGNETIC VALVE

CROSS REFERENCE TO RELATED APPLICATION

The present application is a continuation application of International Patent Application No. PCT/JP2021/005024 filed on Feb. 10, 2021, which designated the U.S. and is based on and claims the benefit of priority from Japanese Patent Application No. 2020-44326 filed on Mar. 13, 2020, the entire disclosure of the above application is incorporated herein by reference.

TECHNICAL FIELD

The present disclosure relates to an electromagnetic valve which opens and closes a flow path of a working fluid.

BACKGROUND

One application for this type of an electromagnetic valve, for example, is a washer fluid system for vehicles. For example, an electromagnetic pump may be used to turn on and/or off a flow of a washer fluid. In addition, an electromagnetic valve may be used to switch flow paths. One flow path may be communicated to a nozzle oriented to a windshield glass. The other one flow path may be communicated to a nozzle oriented to a camera for capturing an external view from the vehicle. A small amount of the washer fluid spilled from the nozzle may cause unintended contamination on the windshield glass or the camera. In the above aspects, or in other aspects not mentioned, there is a need for further improvements in an electromagnetic valve.

SUMMARY

In the present disclosure, the electromagnetic valve is provided by an electromagnetic section and a flow path section. A sealing member is interposed between the electromagnetic section and the flow path section. The electromagnetic section and the flow path section are mechanically fixed by a member. Since the electromagnetic section and the flow path section are separated, an inflow direction of a working fluid into a flow path section and an outflow direction of the working fluid from the flow path section can be freely determined, and a degree of freedom of an outputting direction is increased. Since the electromagnetic section has no flow path for the working fluid, it is possible to reduce the electromagnetic section in size.

The electromagnetic section includes: a core which is arranged in a magnetic circuit formed at the coil is energized; a plunger which is arranged in the magnetic circuit to oppose the core via a magnetic gap; and a normally close compression spring which urges the plunger in a direction away from the core. Further, the flow path section includes: an inflow passage for a working fluid; an outflow passage for the working fluid; a movable valve member; a valve body formed between the inflow passage and the outflow passage and having a normally close valve seat on which the valve member comes in contact with; and a normally open compression spring which urges the valve member in a direction away from the normally close valve seat In the disclosure, the contact portion of the valve member with the valve seat has a spherical shape. The valve member is held by being sandwiched between the plunger and the normally open compression spring. The plunger comes in contact with a center portion of the spherical shape of the valve member. The normally open compression spring comes in contact with a peripheral portion of the valve member. As a result, the valve member moves together with the plunger. The valve member can be reliably seated on the valve seat even if the plunger is slightly tilted.

A preferable embodiment in this disclosure may have the configurations described below. In one embodiment, a spring receiver in an annular shape is formed at an equator portion of the valve member. As a result, since it is possible to stabilize contact location to the valve member in an assembling work caused by error differences of inner diameters of the normally open compression springs and dimensional error differences of spherical surfaces of the valve members, it is possible to stabilize a load of the normally open compression springs by suppressing differences of deformations of the springs. As a result, it is possible to stabilize an urging load on the valve member when it is seated on the normally open valve seat, and it is possible to reduce concerns about liquid leakage due to insufficient urging load.

More specifically, if the normally open compression spring comes in contact with the spherical portion of the valve member, the contact position with the valve member varies due to error of the size within the diameter tolerance of the normally open compression spring. Will occur. In the case that the diameter of the normally open compression spring is small, it comes in contact with the valve member on a side closer to a center axis of the valve member. In the case that the diameter is large, it comes in contact with on a side to an outer periphery of the valve member. On the other hand, in the case that a spring receiver in an annular shape is provided at the equator portion, error differences in diameters of the normally open compression springs can be absorbed by the spring receiver. As a result, it is possible to stabilize a spring length of the normally open compression spring, and a compressive force is kept stable.

In one embodiment, the valve body includes two members, an upper body and a lower body. It is possible to simplify a configuration of the flow path section by forming the outflow passage and the normally open valve seat on the upper body and forming the normally close valve seat on the lower body.

In one embodiment, the normally close valve seat and the normally open valve seat are arranged so as to face each other, and the normally close valve seat and the normally open valve seat have taper shapes corresponding to the spherical shape of the valve member. It is possible to improve a sealing performance by guiding the valve member by the taper shape portions.

In one embodiment, a normally open outflow passage is formed in the upper body. The electromagnetic valve of the present disclosure may be used as a normally open type on/off switchable two-way valve.

In one embodiment, a normally close outflow passage is formed in the upper body. The electromagnetic valve of the present disclosure may be used as a normally close type on/off switchable two-way valve.

In one embodiment, the outflow passage includes two, the normally close outflow passage and the normally open outflow passage. The normally open outflow passage is formed in the upper body, and the normally close outflow passage is formed in the lower body. The electromagnetic valve of the present disclosure may be used as a three-way valve.

BRIEF DESCRIPTION OF DRAWINGS

FIG. 8 is a top view of the pressure relief valve member illustrated in

FIG. 2.

DETAILED DESCRIPTION

JP2014-66309A discloses a comparative example, in which a flow path of a washer fluid is switched by using an electromagnetic valve so that the washer fluid flows to a wind glass when the electromagnetic valve is not energized and flows to a rear camera when the electromagnetic valve is energized. A coil and a yoke are arranged around a second discharge port connected to the rear camera. Therefore, a volume of the electromagnetic section including the coil and the yoke is large. Further, since a passage (second discharge port) through which the working fluid flows is formed in the electromagnetic section, an outputting direction of the working fluid is also limited.

Further, as a result of the working fluid passage (second discharge port) being located at a center of the electromagnetic section, a plunger for urging the valve member toward a side to the valve seat has to be a cylindrical shape. Further, since the plunger and the valve member are integrally fixed, if the plunger is tilted, there is a concern that liquid may leak due to poor seating of the valve member on the valve seat.

In view of the above points, it is an object of the present disclosure to provide an electromagnetic valve which improve a degree of freedom of an outputting direction of the working fluid, reduces a size of the electromagnetic section, and allows reliable seating of the valve member on the valve seat regardless of an inclination of the plunger.

First Embodiment

Figure 1:
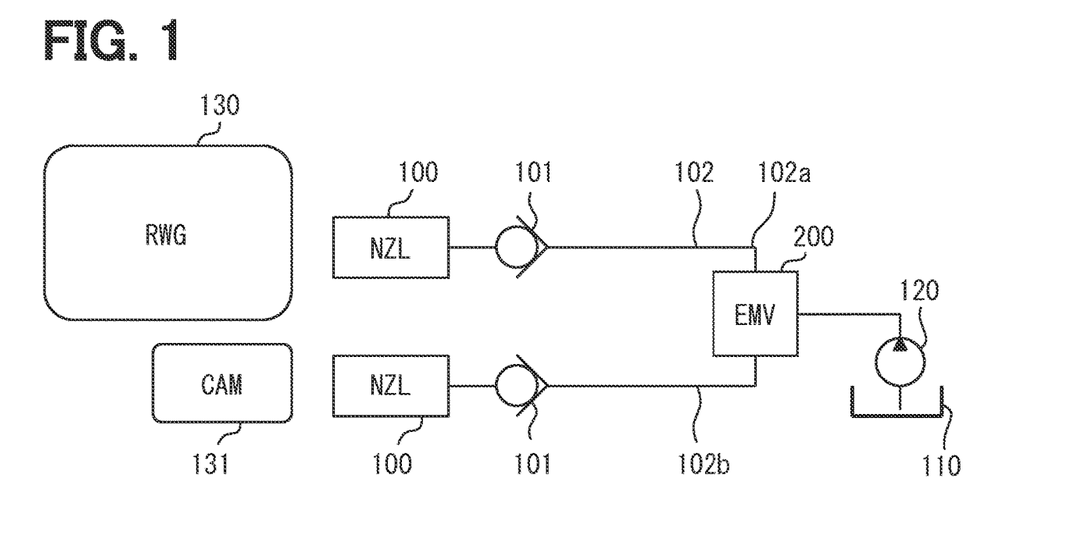
FIG. 1 is a diagram illustrating a piping configuration of an electromagnetic valve.

The first embodiment is a fluid system as shown in FIG. 1. In the fluid system, a pipe 102 is arranged. The fluid system uses a three-way valve which switches flow paths as an electromagnetic valve 200 (EMV). A nozzle 100 (NZL) of a normally closed pipe 102a faces a rear window glass 130 (RWG), and injects a washer fluid to the rear window glass 130. A nozzle of a normally open pipe 102b faces a camera 131 (CAM) and injects the washer fluid to the camera 131. Unlike JP2014-66309A, the washer fluid from a pump 120 is injected onto the camera 131 when the electromagnetic valve 200 is not energized in the present disclosure. This is because the camera 131 is used more frequently than the rear window glass 130.

Figure 2:
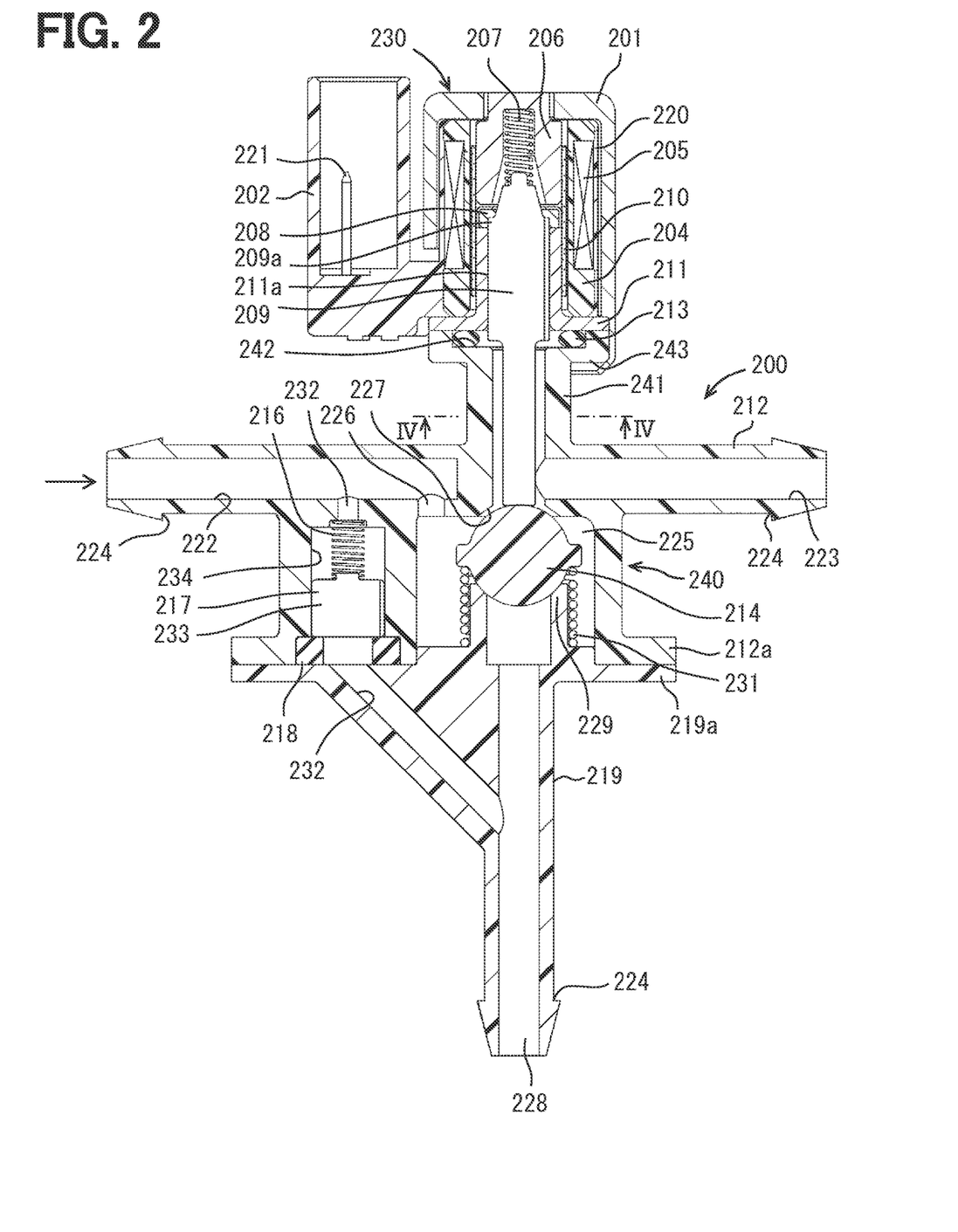
FIG. 2 is a cross-sectional view of the electromagnetic valve of a first embodiment.
Figure 3:
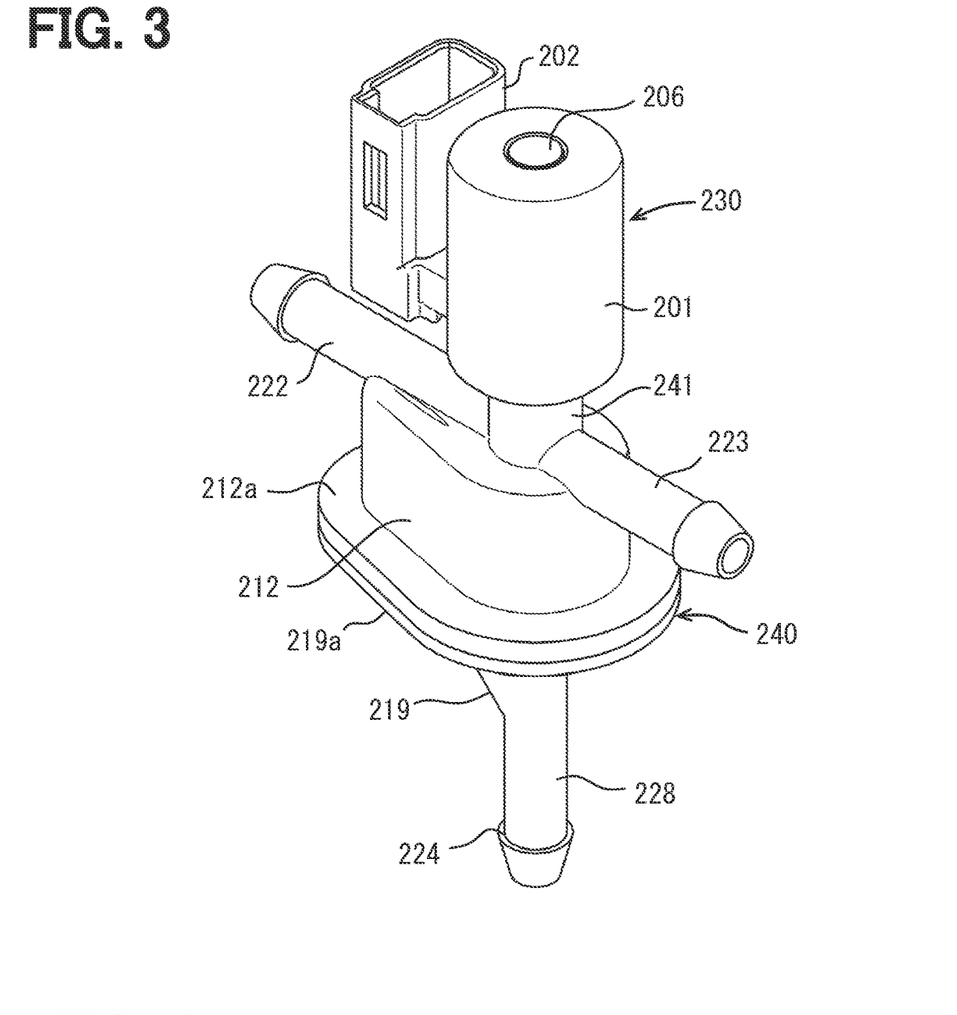
FIG. 3 is a perspective view of the electromagnetic valve illustrated in FIG. 2.
Figure 4:
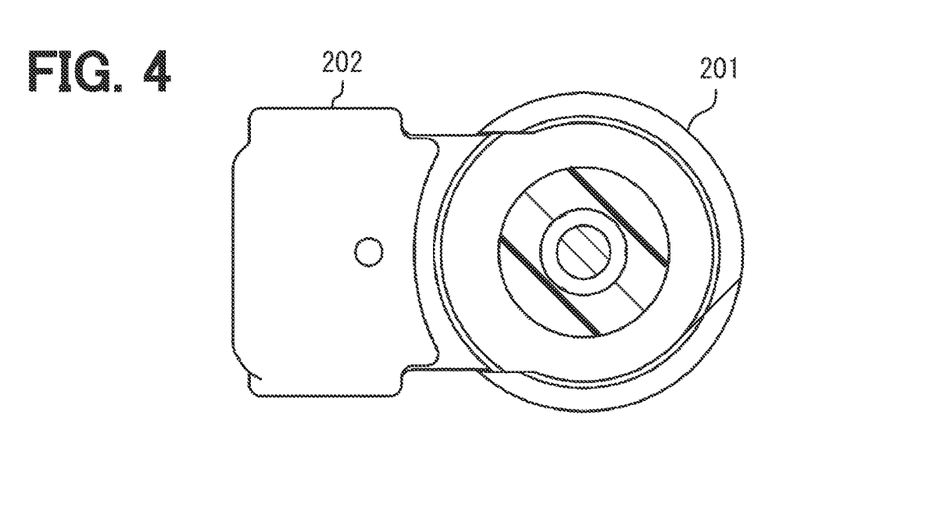
FIG. 4 is a cross-sectional view taken along a line IV-IV in FIG. 2.

As shown in FIGS. 2 to 4, in the electromagnetic valve 200 has a coil 205 made of a copper wire wound many times around a resin coil bobbin 204. A stator 211 is arranged on an inner circumference of the coil bobbin 204 via a sleeve 210. The sleeve 210 is made of a non-magnetic material, for example, SUS304. On the other hand, the stator 211 is made of a magnetic material, for example, SUS430.

Further, the outer circumference of the coil bobbin 204 is covered with a resin outer shell 220. The outer shell 220 is integrally formed with a connector 202. A pair of terminals 221 are embedded and molded in the connector 202. The pair of terminals 221 are connected to a positive side and a negative side of the coil 205, respectively.

A core 206 made of a magnetic material is arranged in an inside of the coil bobbin 204. The core 206 has a cylindrical shape which is closed at an upper end and has an open end. The open end is a tapered shape.

The plunger 209 is arranged so as to face the tapered shape portion of the core 206. The plunger 209 has a cylindrical shape, and is formed with an upper end formed in a tapered shape corresponding to the tapered shape of the core 206. The plunger 209 has a shoulder portion 209a continuous with the upper end of the tapered shape. A washer 208 is engaged with the shoulder portion 209a. The washer 208 is a non-magnetic material such as SUS304. The washer 208 prevents the magnetic core 206 and the plunger 209 from remaining attracted by a residual magnetic force after an end of energization. The plunger 209 is guided by a cylindrical portion 211a of the stator 211 and moves in the vertical direction in FIG. 2.

A normally close compression spring 207 which urges the plunger 209 in the direction of pulling it away from the core 206 is arranged in the core 206. A yoke 201 is arranged on an outer periphery of the outer shell 220 of the coil bobbin 204. The yoke 201 is made of magnetic steel. When the coil 205 is energized, a magnetic circuit is formed by the yoke 201, the core 206, the plunger 209, and the stator 211. The core 206 is arranged in a magnetic circuit formed when the coil 205 is energized. The plunger 209 is arranged in a magnetic circuit. The plunger 209 is movable. The plunger 209 faces the core 206 in the movable direction. The plunger 209 is movable between a close position close to the core 206 and a distance position away from the core 206. The plunger 209 faces the core 206 via a magnetic gap.

The electromagnetic section 230 is configured with the above configuration, The electromagnetic section 230 is coupled to a flow path section 240 via an O-ring 213. The flow path section 240 includes a valve body. The valve body is divided into an upper body 212 and a lower body 219.

The electromagnetic valve 200 includes an electromagnetic section 230 and a flow path section 240. The electromagnetic valve 200 includes an O-ring 213 as a sealing member interposed between the flow path section 240 and the electromagnetic section 230. The electromagnetic valve 200 includes a fixing member which mechanically fixes the flow path section 240 and the electromagnetic section 230 with each other. The flow path section 240 and the electromagnetic section 230 are mechanically fixed via the O-ring 213. The flow path section 240 and the electromagnetic section 230 can be assembled from a separated state to an integrally connected fixed state. The fixed state of the flow path section 240 and the electromagnetic section 230 in the electromagnetic valve 200 is a state in which members cannot be separated without destruction or deformation. The fixing member may include a member to be caulked. In this embodiment, the fixing member includes an edge at one end of the yoke 201 and a shoulder 243. The fixing member can also be referred to as a connecting member which connects the flow path section 240 and the electromagnetic section 230. The fixing member may be provided by a threading mechanism which includes male and female threads. The fixing member may be provided by a bolt and a nut. The fixing member may include a welded portion that has been hardened after being melted by welding, or an adhesive that has been hardened after being bonded.

The upper body 212 is formed with an inflow passage 222 into which the high-pressure washer fluid from the pump 120 flows in, and a normally open outflow passage 223 connected to the normally open pipe 102b toward the camera 131. An outer periphery of an end portion of the inflow passage 222 and the normally open outflow passage 223 is tapered so that the pipe 102 can be easily connected. A shoulder portion 224 is formed at an end of the tapered shape to prevent the pipe 102 from being disassembled.

A valve chamber 225 is formed in the upper body 212. The valve chamber 225 communicates with the inflow passage 222 through a communication hole 226. The valve chamber 225 also communicates with the normally open outflow passage 223 via a normally open valve seat 227.

A connection portion 241 with the electromagnetic section 230 is formed on an upper portion of the upper body 212. The connecting portion 241 has a circular and tubular shape, and a plunger 209 is arranged inside thereof. Further, an upper portion of the connecting portion 241 expands in a flange shape to form a surface 242 receiving the O-ring 213. The upper portion of the connecting portion 241 provides a shoulder portion 243 to which the yoke 201 is locked by caulking.

The lower body 219 is formed with a normally close outflow passage 228 connected to a normally close pipe 102a leading to the rear window glass 130. It is similar to the above-mentioned inflow passage 222 to be the end portion in the tapered shape and to form the shoulder portion 224. The normally close outflow passage 228, the inflow passage 222, and the normally open outflow passage 223 commonly have an inner diameter of about 3 mm.

The lower body 219 is formed with a cylindrical normally close valve seat 229 protruding into the valve chamber 225. The valve member 214 in a spherical shape is arranged in the valve chamber 225 between the normally open valve seat 227 and the normally close valve seat 229. The normally open valve seat 227 and the normally close valve seat 229 have a tapered shape respectively, and commonly have an inner diameter of less than 5 mm.

Figure 5:
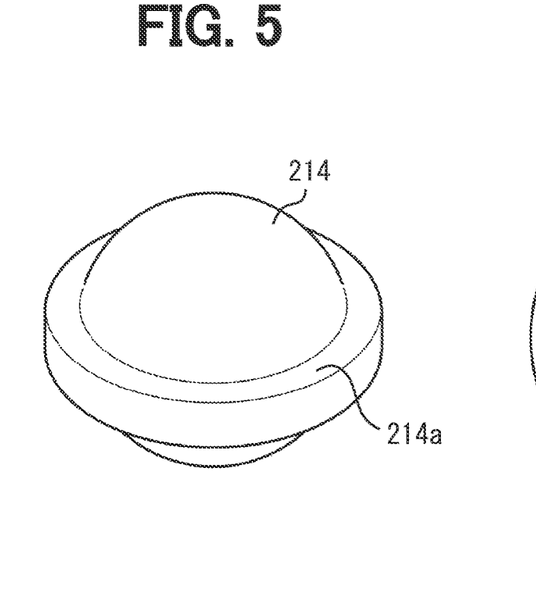
FIG. 5 is a perspective view of a valve member illustrated in FIG. 2.
Figure 6:
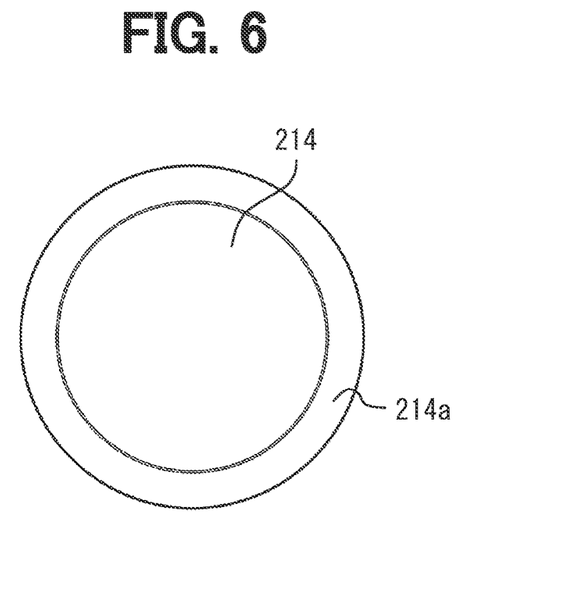
FIG. 6 is a top view of the valve member illustrated in FIG. 2.

As shown in FIGS. 5 and 6, the valve member 214 has a spherical shape having a diameter of a little over 7 mm, and a spring receiver 214a in an annular shape which protrudes a little less than 1 mm at an equator portion. The valve member 214 is integrally molded with the spring receiver 214a by a water resistant rubber, and has a coating on the surface. This rubber material is the same as the O-ring 213. The coating material is a substance such as fluorine or molybdenum that prevents the surface of rubber from melting and improves the seating property of the valve member and the valve seat combined.

A normally open compression spring 231 is arranged on the outer periphery of the cylindrical normally close valve seat 229. An inner diameter of the normally open compression spring 231 is slightly larger than an outer diameter of the normally close valve seat 229, and is held by the normally close valve seat 229. The normally open compression spring 231 engages with the spring receiver 214a of the valve member 214 to urge the valve member 214 toward a side to the normally open valve seat 227.

As a result, both an urging force of the normally close compression spring 207 and an urging force of the normally open compression spring 231 received via the plunger 209 are applied to the valve member 214. Here, since an urging force of the normally close compression spring 207 is sufficiently larger than an urging force of the normally open compression spring 231, the valve member 214 is pressed against the normally close valve seat 229 to close the normally outflow passage 228 when the coil 205 is not energized.

The lower body 219 is formed with a pressure relief passage 232 which bypasses the normally close valve seat 229 and connects the inflow passage 222 and the normally close outflow passage 228. Further, the pressure relief passage 232 is also formed in the upper body 212. An inner diameter of the pressure relief passage 232 is about 2 mm.

A pressure relief valve 233 for opening and closing the pressure relief passage 232 is arranged in the upper body 212. The pressure relief valve 233 includes a pressure relief valve seat 218, a pressure relief valve member 217, and a pressure relief spring 216. The pressure relief valve seat 218 is made of a rubber material having a fluorine coating on a surface similar to the valve member 214. The pressure relief valve seat 218 is held by being sandwiched between the upper body 212 and the lower body 219.

The pressure relief valve member 217 is made of resin, has a cylindrical shape, and can move along the pressure relief guide 234 formed on the upper body 212. Both an outer diameter of the pressure relief valve member 217 and an inner diameter of the pressure relief guide 234 are about diameters little over 5 mm.

Figure 7:
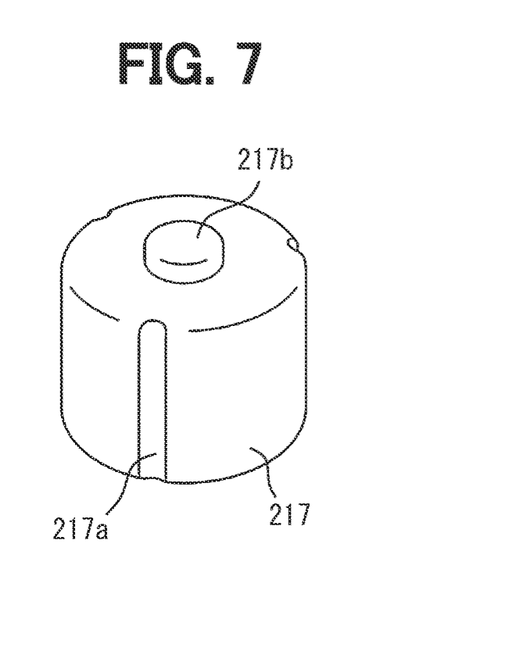
FIG. 7 is a perspective view of a pressure relief valve member illustrated in FIG. 2.
Figure 8:
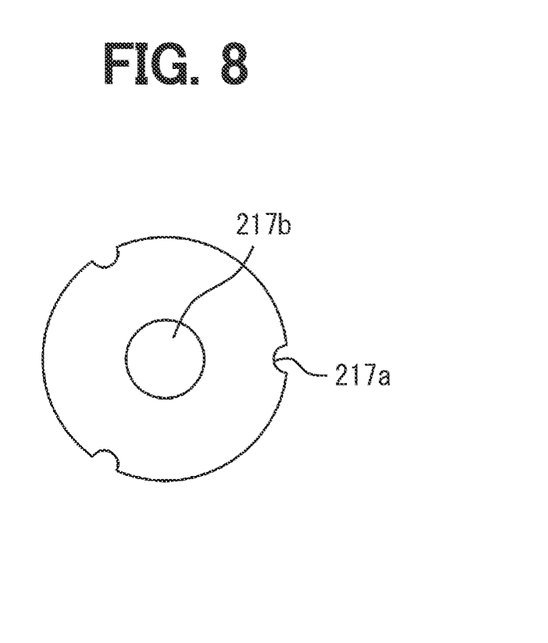

As shown in FIGS. 7 and 8, three pressure relief grooves 217a are formed on an outer periphery of the pressure relief valve member 217. The pressure relief groove 217a is a semicircle with a radius of about 0.3 mm. On an upper surface of the pressure relief valve member 217, a pressure relief spring receiver 217b for receiving the pressure relief spring 216 is formed in a protruding manner in a columnar shape.

Therefore, the pressure relief spring 216 is held by being sandwiched between the pressure relief spring receiver 217b and a spring receiver formed at a lower end of the pressure relief passage 232 of the upper body 212. The pressure relief spring 216 urges the pressure relief valve member 217 toward a side to the pressure relief valve seat 218. A set pressure (relief pressure) of the pressure relief spring 216 is about 5 kilopascals, which is less than and is about a half of a set pressure (open pressure) of the stop valve 101.

Next, a method of assembling the electromagnetic valve 200 having the above structure is described. The method for assembling the electromagnetic valve 200 includes a first assembling step of the electromagnetic section 230, a second assembling step of the flow path section 240, and a fixing step of connecting the electromagnetic section 230 and the flow path section 240 and fixing them to each other. The method of assembling the electromagnetic valve 200 may be executed in an order of the first assembling step, the second assembling step, and the fixing step. The method of assembling the electromagnetic valve 200 may be executed in an order of the first assembling step, the fixing step, and the second assembling step. The method of assembling the electromagnetic valve 200 may be executed in an order of the second assembling step, the first assembling step, and the fixing step.

First, the first assembling step for the electromagnetic section 230 is described. The coil 205 is wound many times around the outer circumference of the coil bobbin 204. A pair of terminals 221 are connected to both ends of the coil 205. In that state, the outer shell 220 and the connector 202 are molded with resin. The resin, for example, may be provided by Polyphenylene sulfide. Next, the core 206 and the stator 211 are arranged in the inner circumference of the coil bobbin 204 via the sleeve 210. After that, the yoke 201 is arranged on the outer circumference of the outer shell 220.

Subsequently, the fixing step of fixing the electromagnetic section 230 and the flow path section 240 is described. The O-ring 213 is arranged on the upper surface 242 of the upper body 212, the normally close compression spring 207 is arranged inside the core 206, and the plunger 209 is arranged on the inner diameter of the stator 211. In this state, the flow path section 240 and the electromagnetic section 230 are arranged at specified positions, but are combined in a separable manner. After that, a lower end edge of the yoke 201 is caulked toward the shoulder portion 243 of the upper body 212. The state of caulking is shown in FIG. 4. The caulking is performed on an entire circumference of the yoke 201 except for a portion where the connector 202 is located. The lower edge of the yoke 201 provides a portion of a fixing member that mechanically fixes the electromagnetic section 230 and the flow path section 240. The shoulder portion 243 also provides a portion of the fixing member.

By caulking the yoke 201, the upper end of the upper body 212 comes into contact with the lower end of the stator 211. The O-ring 213 is compressed and deformed by the lower end of the stator 211 and the upper surface 242 of the upper body 212. The O-ring 213 is placed in a state where it demonstrates a sealing function.

The second assembling step for the flow path section 240 is described. The pressure relief spring 216 and the pressure relief valve member 217 are arranged on the pressure relief guide 234 of the upper body 212. After that, the pressure relief valve seat 218 is arranged in an opening of the pressure relief guide 234. The valve member 214 is arranged on the normally open valve seat 227, and the normally open compression spring 231 is arranged so as to come in contact with the spring receiver 214a.

In this state, a flange 212a of the upper body 212 and a flange 219a of the lower body 219 are brought into contact with each other and welded between them.

According to the present disclosure, since the flow path section 240 is assembled after the electromagnetic section 230 is assembled, it is possible to select shapes of parts below the upper body 212, and it is possible to use the electromagnetic section 230 as a common part. As is described in a second and subsequent embodiments, the flow path section 240 may change directions of the inflow passage 222, the normally open outflow passage 223, and the normally close outflow passage 228. Furthermore, the normally open outflow passage 223 or the normally close outflow passage 228 may be eliminated to make it as a two-way valve. Even if the flow path section 240 is changed in this way, the same electromagnetic section 230 can be commonly used.

According to the present disclosure, the plunger 209 and the valve member 214 are separated, the plunger 209 is arranged in the electromagnetic section 230, and the valve member 214 is arranged in the flow path section 240. Therefore, it is possible to assemble the flow path section 240 after assembling the electromagnetic section 230 as described above, and it is possible to improve an ability of assemble.

Next, an operation of the electromagnetic valve 200 of the present disclosure is described.

In the case that the washer fluid is injected from the nozzle 100 toward the camera 131, the electromagnetic valve 200 is not energized. Therefore, the valve member 214 receives the urging force of the normally close compression spring 207 via the plunger 209 and closes the normally close valve seat 229.

As an operation of the pump 120 is started, the high-pressure washer fluid is sent to the electromagnetic valve 200 via the pipe 102. Pumped washer fluid flows into the inflow passage 222, and then flows out from the normally open outflow passage 223 via the communication hole 226, the valve chamber 225, and the normally open valve seat 227.

During this period of time, the valve member 214 is pressed against the normally close valve seat 229 by receiving the pressing pressure of the normally close compression spring and a pressure of the washer fluid. Here, even if a position of the valve member 214 is slightly displaced, a contact surface of the valve member 214 with the normally close valve seat 229 has a spherical shape, and the normally close valve seat 229 has a tapered shape, therefore, it is always guided in directions to coincide center axes. Therefore, the valve member 214 surely comes in contact with the normally close valve seat 229 and demonstrates sufficient sealing performance.

The washer fluid of the electromagnetic valve 200 is injected from the nozzle 100 via the normally open pipe 102b. Since the pressure of the washer fluid rises to about 400 Kilopascals, the open pressure of the stop valve 101 (about 10 kilopascals) is hardly a problem.

If the cleaning of the camera 131 is completed, the operation of the pump 120 is stopped. Since the pressure in the pipe 102 becomes atmospheric pressure when the pump is stopped, the pipe 102 is closed by the stop valve 101. By closing the stop valve 101, it is possible to improve a sharp liquid shut off property in response to an end of injection. In addition, the washer fluid can be stored in the pipe 102, and a responsiveness at the next operation can be improved.

In the case that the washer fluid is injected onto the rear window glass 130, the electromagnetic valve 200 is energized. The coil 205 is magnetized by energization to form a magnetic circuit that passes through the yoke 201, the core 206, the plunger 209, and the stator 211. The plunger 209 moves to a side to the core 206 against the compressive force of the normally close compression spring 207, the magnetic gap between the tapered portion of the core 206 and the tapered portion of the plunger 209 is narrowed by the magnetic force.

As the plunger 209 moves, the valve member 214 is urged up by the normally open compression spring 231 to close the normally open valve seat 227. The operation of the electromagnetic valve 200 described above is performed before the start of operation of the pump 120. Therefore, a pressure of the high-pressure washer fluid from the pump 120 is not applied to the valve member 214, and the movement of the valve member 214 is not hindered.

Here, since the plunger 209 has a structure in which it comes into contact with the spherical shape portion of the valve member 214 in a detachable manner, the valve member 214 may be slightly displaced when the plunger 209 is moved. In other words, the present disclosure is configured to allow some deviation of the valve member 214. However, the valve member 214 can reliably seal the normally open valve seat 227 even if it slightly displaced in accordance with an extending action of the normal open compression spring 231, since the valve member 214 has a spherical shape and the normally open valve seat 227 also has a tapered shape corresponding to the valve member 214. In particular, since the valve member 214 is made of rubber, it can be brought into close contact with the normally open valve seat 227 by its own elasticity, and the sealing property can be further improved.

Further, since the normally open compression spring 231 comes in contact with the annular spring receiver 214a of the valve member 214 formed on the equator portion, it is possible to keep a predetermined pressing force. That is, if the normally open compression spring 231 came in contact with the spherical shape portion of the valve member 214, the normally open compression spring 231 might be more compressed if it came in contact with a central portion of the valve member 214 in comparison with if it came in contact with a peripheral portion depending on error differences of the diameters thereof. On the other hand, in this embodiment, since the normally open compression spring 231 comes in contact with the annular portion, the length of the normally open compression spring 231 in the mounted state can be kept constant regardless of error differences of the diameters thereof.

After energizing the electromagnetic valve 200 to switch the flow paths, the operation of the pump 120 is started. The high pressure washer fluid from the pump 120 flows into the inflow passage 222, and then flows out from the normally close outflow passage 228 via the communication hole 226, the valve chamber 225, and the normally close valve seat 229. The washer fluid flows out through the normally close pipe 102a via the stop valve 101, and is injected from the nozzle 100 to the rear window glass 130.

During this time, the valve member 214 receives the high pressure of the washer fluid and is pressed against the normally open valve seat 227. As described above, since the spherical shape portion of the valve member 214 comes in contact with the tapered shape of the normally open valve seat 227, the valve member 214 is guided in a direction in which the axes coincide with each other, and the valve member 214 reliably comes in contact with the normally open valve seat 227 to demonstrate sufficient sealing performance.

When a cleaning of the rear window glass 130 is completed, the operation of the pump 120 is stopped, and when the pressure in the normally close pipe 102a drops below the open pressure of the stop valve 101, the stop valve 101 is also closed. Subsequently, the energization of the electromagnetic valve 200 is also terminated. Since the washer 208 made of a non-magnetic material is interposed between the core 206 and the plunger 209, the plunger 209 is urged down by the normally close compression spring 207 in response to a finish of energization.

Since an urging force of the normally close compression spring 207 is larger than an urging force of the normally open compression spring 231, the valve member 214 is urged against the normally close valve seat 229. Since the normally close valve seat 229 also has a tapered shape corresponding to the spherical shape of the valve member 214, it can be reliably sealed as mentioned above.

As described above, according to the present disclosure, the valve member 214 comes in contact with the plunger 209 in a detachable manner. The valve member 214 is in a spherical shape. The valve member 214 is arranged so as to fit within the tapered shape of the normally open valve seat 227 and the normally close valve seat 229. Therefore, it is not necessary to provide a guide for the valve member 214, and an assembly work of the valve member 214 becomes easy. A core axis of the valve member 214 may shift due to an influence of the normally open compression spring 231 and the washer fluid flow. Even in this case, a shifting of the valve member 214 is within a range of the normally open valve seat 227 and the normally close valve seat 229. Therefore, the valve member 214 is urged against the normally open valve seat 227 or the normally close valve seat 229 by the normally close compression spring 207 and a pressure of the washer fluid. Both the normally open valve seat 227 and the normally closed valve seat 229 have tapered shapes. Therefore, the valve member 214 is guided by the tapered shape, and the valve member 214 comes into contact with the normally open valve seat 227 or the normally close valve seat 229 on the entire circumference thereof.

When the ambient temperature rises while the operation of the pump 120 is completed, the washer fluid and air in the pipe 102 expand. The normally open pipe 102b is closed by the stop valve 101, but since the normally open valve seat 227 is open, the pressure is released to a side to the pump 120 and does not become high. However, since both the normally close valve seat 229 and the stop valve 101 are closed in the normally close pipe 102a, the washer fluid is trapped in the normally close pipe 102a. Therefore, the pressure in the normally close pipe 102a may rise due to an expansion of the washer fluid and the air.

If the pressure rises equal to or higher than the open pressure of the stop valve 101, the washer fluid in the normally close pipe 102a may leak from the nozzle 100 to the rear window glass 130. However, according to this embodiment, the pressure relief valve 233 is opened to release the pressure, so that the leakage of the washer fluid can be reliably prevented.

If the pressure in the normally close pipe 102a becomes higher than the relief pressure, it lifts the pressure relief valve member 217 by overcoming an urging force of the pressure relief spring 216. As a result, the pressure relief valve seat 218 is opened and the pressure relief passage 232 is opened. The normally close outflow passage 228 communicates with the inflow passage 222 via the pressure relief groove 217a of the pressure relief valve member 217 and the pressure relief guide 234.

Since the relief pressure of the pressure relief valve 233 is about half of the open pressure of the stop valve 101, the pressure relief valve 233 opens before the stop valve 101 opens so that it is possible to suppress a pressure rise in the normally close pipe 102a.

Here, since the pressure relief passage 232 releases the pressure of a trapped part of the washer fluid, a large amount of the washer fluid does not flow in the pressure relief passage 232. Therefore, even if there is a portion having a small flow path cross-sectional area such as the pressure relief groove 217a, no malfunction occurs in an operation. In FIGS. 7 and 8, three pressure relief grooves 217a are formed, but these are designed in a symmetrical shape around the axis to balance them, and the number of pressure relief groove 217a may be one in the flow path cross-sectional area.

Further, since the pressure relief valve member 217 is held by the guide 234, even if the set pressure of the pressure relief spring 216 is small, a seal between the pressure relief valve member 217 and the pressure relief valve seat 218 is ensured.

Second Embodiment

Figure 9:
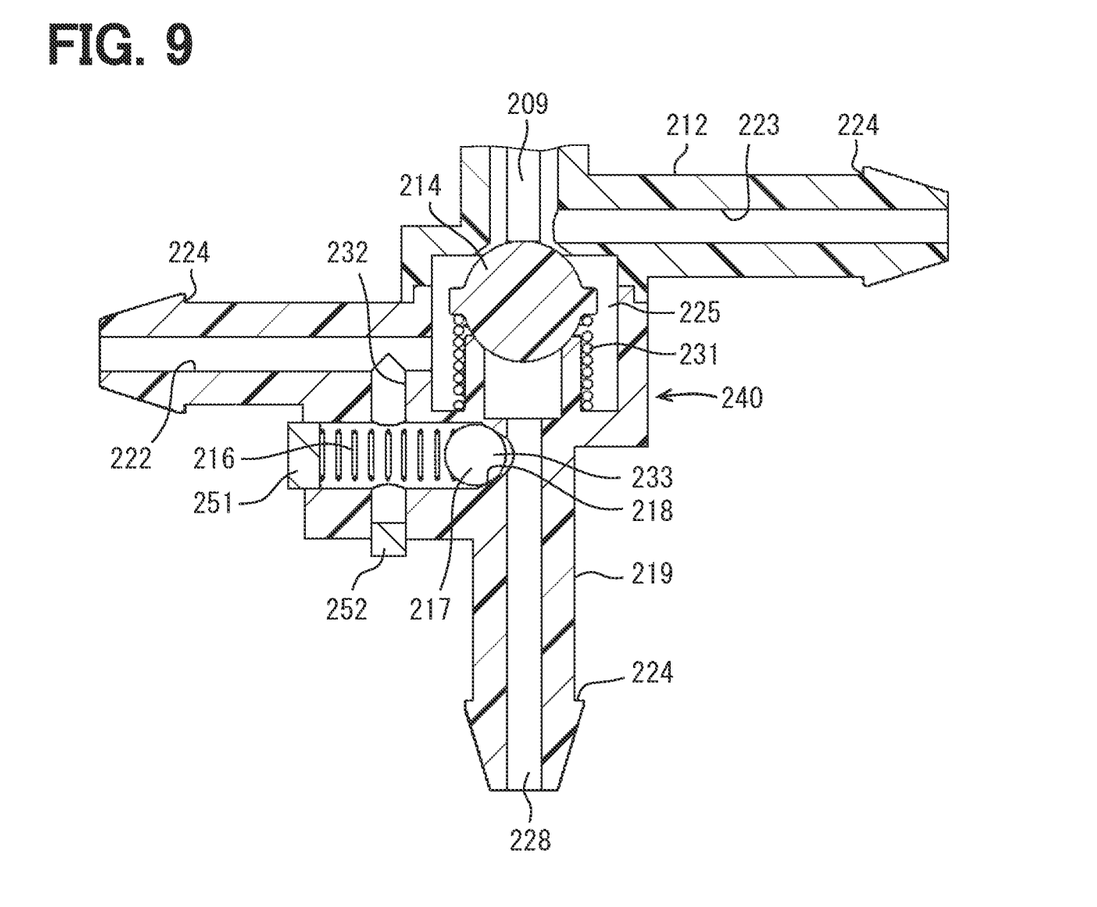
FIG. 9 is a cross-sectional view of an electromagnetic valve of a second embodiment.

In the above embodiment, the inflow passage 222 is formed in the upper body 212. Alternatively, in this embodiment, as shown in FIG. 9, the inflow passage 222 is formed in the lower body 219. Therefore, all the pressure relief passages 232 are also formed by the lower body 219. The sealing plug 252 closes the pressure relief passage 232.

In this embodiment, the guide 234 is formed in the horizontal direction, and the pressure relief valve seat 218 is formed around the normally close outflow passage 228 of the lower body 219. After the pressure relief valve member 217 and the pressure relief spring 216 are inserted into the guide 234, the guide 234 is closed by the stopper 251 which also serves as a spring receiver.

Third Embodiment

Figure 11:
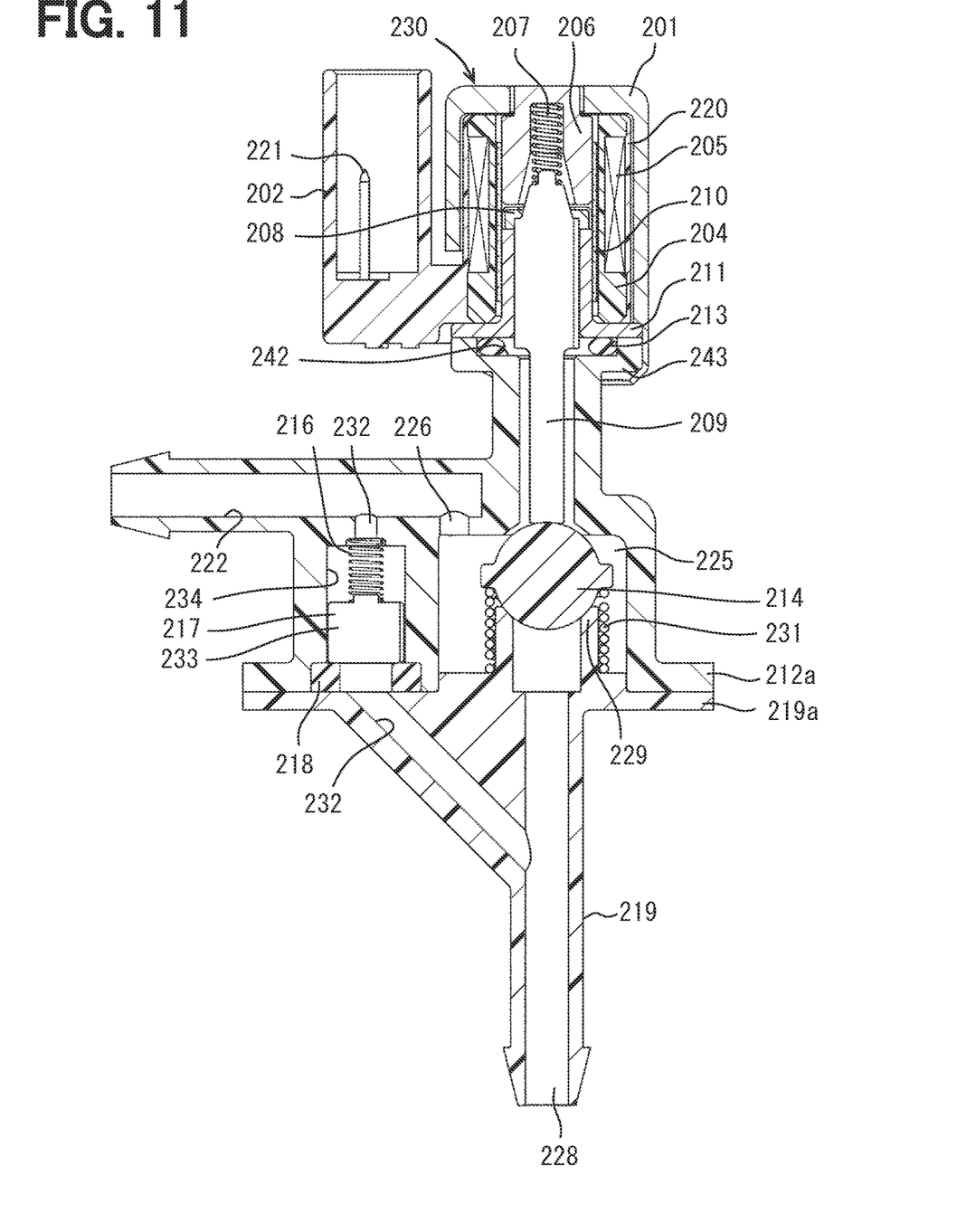
FIG. 11 is a cross-sectional view of an electromagnetic valve of a third embodiment.

In the above-described embodiment, the electromagnetic valve is a three-way valve including the normally close outflow passage 228 and the normally open outflow passage 223 as outflow passages. Alternatively, in this embodiment, the electromagnetic valve is a on/off switchable type two-way valve whose outflow passage is a normally close outflow passage 228 alone. FIG. 11 shows an electromagnetic valve of this embodiment. A structure of the electromagnetic valve 200 is the same as that of the first embodiment except that the normally open outflow passage 223 is eliminated.

Figure 10:
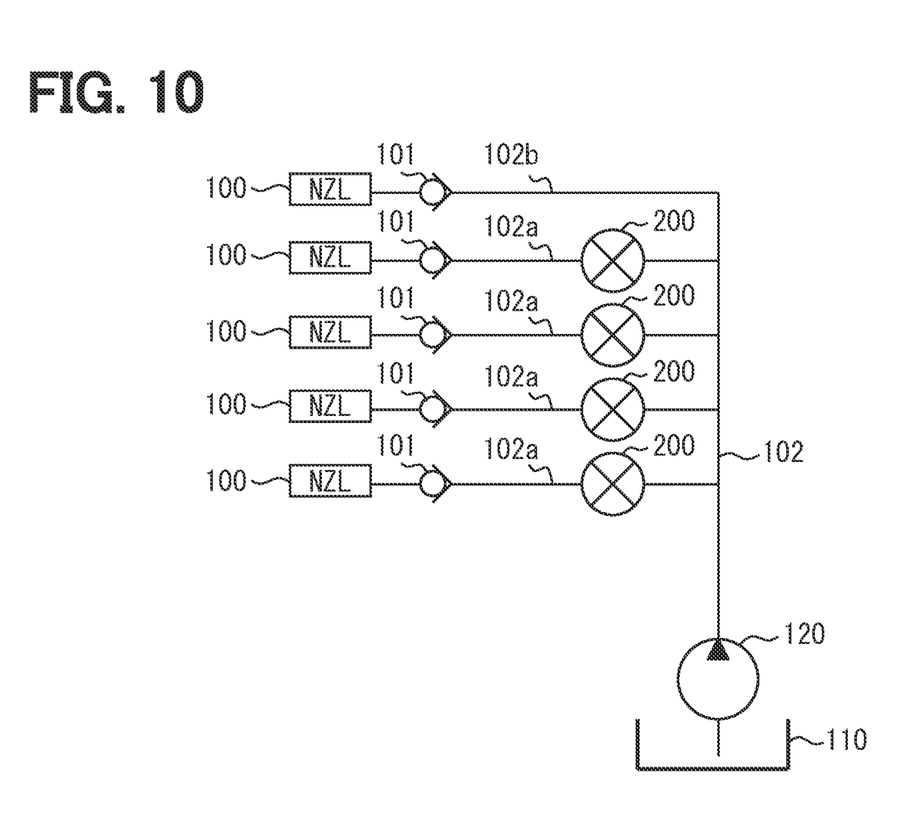
FIG. 10 is a diagram illustrating another piping configuration of an electromagnetic valve.

As shown in FIG. 10, the two-way valve is effective in a case having a plurality of normally close pipes 102a. This is an example in which there are multiple sensors that should be washed with the washer fluid. In FIG. 10, one pipe 102 is used as the normally open pipe 102b and the washer fluid always flows to the nozzle 100 during the pump 120 is operated, but the normally open pipe 102b may be eliminated. Contrary, a plurality of normally open pipes 102b may be used.

Further, in FIG. 10, the number of normally close pipes 102a is four, but the number of the normally close pipes 102a may be increased or decreased depending on an application, and may be one.

Fourth Embodiment

The above embodiment utilizes an on/off type two-way valve which only has the normally close outflow passage 228 as the outflow passage. Alternatively, in this embodiment, the electromagnetic valve is a on/off switchable type two-way valve whose outflow passage is a normally open outflow passage 223 alone.

Figure 12:
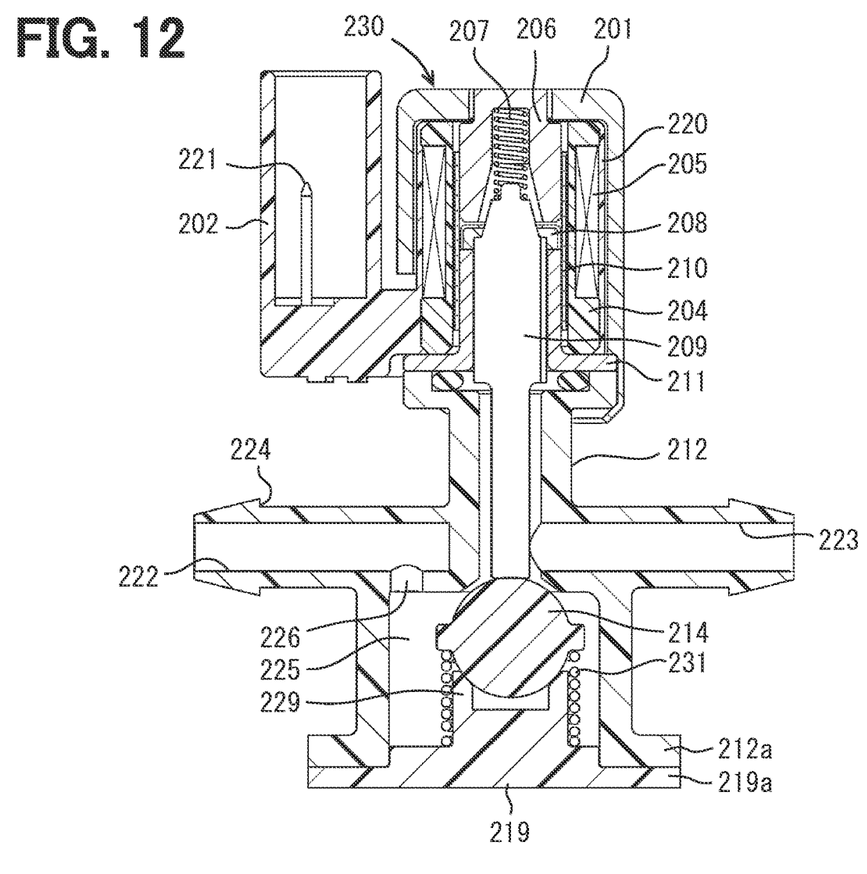
FIG. 12 is a cross-sectional view of an electromagnetic valve of a fourth embodiment.

As shown in FIG. 12, only the normally close valve seat 229 is formed on the lower body 219. In this embodiment, the pressure relief passage 232 and the pressure relief valve 233 described in the above-described embodiments are not provided.

Other Embodiments

In the above embodiments, a connection between the upper body 212 and the lower body 219 is welding. Alternatively, other fixing methods such as a bolt fixing and a clip fixing may be used as the connecting method.

Further, although it is effective to use the flanges 212a and 219a for joining the upper body 212 and the lower body 219, it is possible to join the two without the flanges.

In the above-described embodiments, the inflow passage 222 and the normally open outflow passage 223 are arranged in a straight line, but they may be orthogonal to each other or intersect at other angles.

The same can be applied to a relationship between the inflow passage 222 and the normally close outflow passage 228. These may be arranged in parallel without being orthogonal to each other, and may be intersect at other angles.

Figure 13:
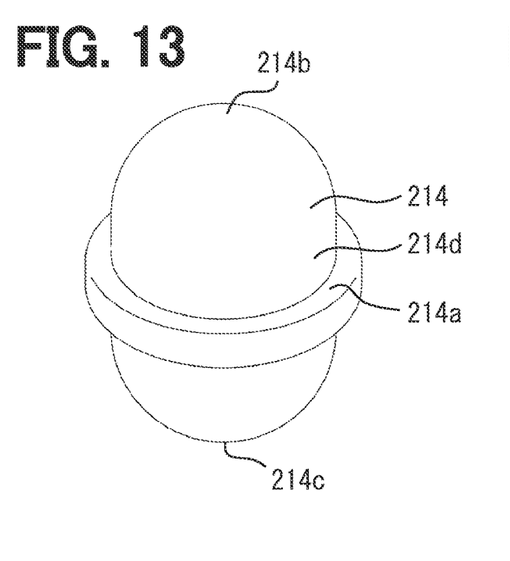
FIG. 13 is a perspective view showing another shape of the valve member.
Figure 14:
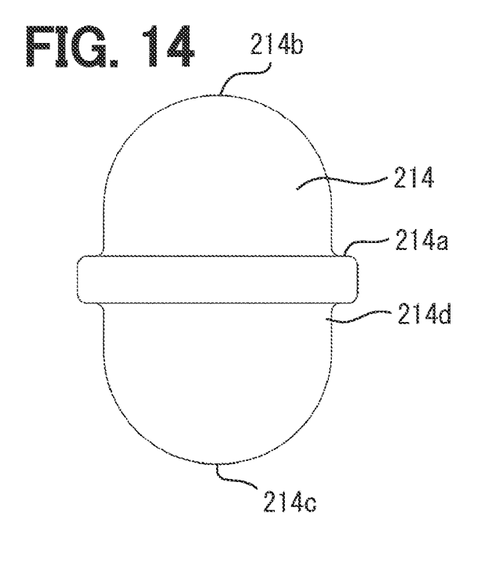
FIG. 14 is a front view of the valve member illustrated in FIG. 13.

In the above embodiment, the valve member 214 has a spherical shape. Alternatively, the valve member may have a shape shown in FIGS. 13 and 14. The valve member has a shape in which both an upper surface 214b, which comes in contact with the normally open valve seat 227, and a lower surface 214c, which comes in contact with the normally close valve seat 229, are in hemispherical shapes, and a cylindrical portion 214d which is provided between the hemispherical shapes. Further, in the embodiment of forming the cylindrical portion 214d, the spring receiver 214a may be formed on the cylindrical portion 214d.

Further, the shape of the normally close valve seat 229 and the normally open valve seat 227 is not limited to the tapered shape, and may be an arc shape that can guide the valve member 214.

Further, although the washer fluid is used as the working fluid, another liquid such as water or oil may be used as the working fluid.

The disclosure in this specification, the drawings, and the like is not limited to the exemplified embodiments. The disclosure encompasses the illustrated embodiments and variations thereof by those skilled in the art.

The embodiments described herein disclose a plurality of technical ideas listed below. A technical idea 1 is an electromagnetic valve (200), comprising: an electromagnetic section (230); a flow path section (240); and a sealing member (213) which is interposed between the electromagnetic section and the flow path section, wherein the electromagnetic section includes: a coil (205) which is magnetized at energization; a core (206) which is arranged in a magnetic circuit formed at the coil is energized; a plunger (209) which is arranged in the magnetic circuit to oppose the core via a magnetic gap; and a normally close compression spring (207) which urges the plunger in a direction away from the core, and wherein the flow path section includes: an inflow passage (222) for a working fluid; an outflow passage (223, 228) for the working fluid; a movable valve member (214); a valve body (212, 219) formed between the inflow passage and the outflow passage and having a normally close valve seat (229) on which the valve member comes in contact with; and a normally open compression spring (231) which urges the valve member in a direction away from the normally close valve seat, and wherein the flow path section and the electromagnetic section are mechanically fixed to each other, and wherein the valve member has a spherical shape on a contact surface with the normally close valve seat and a contact surface with the plunger, and wherein the valve member is held by being sandwiched between the plunger and the normally open compression spring, and wherein the plunger comes in contact with a center of a spherical surface of the valve member in a detachable manner, and wherein the normally open compression spring comes in contact with a peripheral portion of the valve member in a detachable manner, and wherein the valve member moves together with the plunger.

A technical idea 2 is the electromagnetic valve according to the technical idea 1, wherein the valve member forms a spring receiver (214a) in an annular shape at an equator portion, and wherein the plunger comes in contact with a location of a center axis of the valve member, and wherein the normally open compression spring comes in contact with the spring receiver of the valve member. A technical idea 3 is the electromagnetic valve according to the technical idea 1 or the technical idea 2, wherein the valve body includes two members, an upper body (212) and a lower body (219), and wherein a normally open valve seat (227), which opens and closes the inflow passage and the outflow passage, is formed in the upper body, and wherein the normally close valve seat is formed on the lower body.

A technical idea 4 is the electromagnetic valve according to the technical idea 3 according to the technical idea 2, wherein the normally close valve seat and the normally open valve seat are arranged to face each other, and wherein both the normally close valve seat and the normally open valve seat have tapered shapes corresponding to the spherical shape of the valve member. A technical idea 5 is the electromagnetic valve according to the technical idea 3 or the technical idea 4, wherein the outflow passage is a normally open outflow passage (223), and wherein the normally open outflow passage is formed in the upper body. A technical idea 6 is the electromagnetic valve according to the technical idea 3 or the technical idea 4, wherein the outflow passage is a normally close outflow passage (228), and wherein the normally close valve seat is formed on the lower body. A technical idea 7 is the electromagnetic valve according to the technical idea 3 or the technical idea 4, wherein the outflow passage includes two passages, a normally close outflow passage (228) and a normally open outflow passage (223), and wherein the normally open outflow passage is formed in the upper body, and wherein the normally close outflow passage is formed in the lower body.

What is claimed is:

1. An electromagnetic valve, comprising: an electromagnetic section; a flow path section; and a sealing member which is interposed between the electromagnetic section and the flow path section, wherein the electromagnetic section includes: a coil which is magnetized at energization; a core which is arranged in a magnetic circuit formed at the coil is energized; a plunger which is arranged in the magnetic circuit to oppose the core via a magnetic gap; and a normally close compression spring which urges the plunger in a direction away from the core, and wherein the flow path section includes: an inflow passage for a working fluid; an outflow passage for the working fluid; a movable valve member; a valve body formed between the inflow passage and the outflow passage and having a normally close valve seat on which the valve member comes in contact with; and a normally open compression spring which urges the valve member in a direction away from the normally close valve seat, and wherein the flow path section and the electromagnetic section are mechanically fixed to each other, and wherein the valve member has a spherical shape on a contact surface with the normally close valve seat and a contact surface with the plunger, and wherein the valve member is held by being sandwiched between the plunger and the normally open compression spring, and wherein the plunger comes in contact with a center of a spherical surface of the valve member in a detachable manner, and wherein the normally open compression spring comes in contact with a peripheral portion of the valve member in a detachable manner, and wherein the valve member moves together with the plunger, and wherein the valve member forms a spring receiver extending in an annular shape at an equator portion, and wherein the plunger comes in contact with a location of a center axis of the valve member, and wherein the normally open compression spring comes in contact with the spring receiver of the valve member.

2. The electromagnetic valve according to claim 1, wherein
   the valve body includes two members, an upper body and a lower body, and wherein
   a normally open valve seat, which opens and closes the inflow passage and the outflow passage, is formed in the upper body, and wherein
   the normally close valve seat is formed on the lower body.

3. The electromagnetic valve according to claim 2, wherein
   the normally close valve seat and the normally open valve seat are arranged to face each other, and wherein
   both the normally close valve seat and the normally open valve seat have tapered shapes corresponding to the spherical shape of the valve member.

4. The electromagnetic valve according to claim 2, wherein
   the outflow passage is a normally open outflow passage, and wherein
   the normally open outflow passage is formed in the upper body.

5. The electromagnetic valve according to claim 2, wherein
   the outflow passage is a normally close outflow passage, and wherein
   the normally close valve seat is formed on the lower body.

6. The electromagnetic valve according to claim 2, wherein
   the outflow passage includes two passages, a normally close outflow passage and a normally open outflow passage, and wherein
   the normally open outflow passage is formed in the upper body, and wherein
   the normally close outflow passage is formed in the lower body.

* * * * *